H. CASLER.
DRILL CHUCK.
APPLICATION FILED MAR. 29, 1919.
1,432,278.
Patented Oct. 17, 1922.
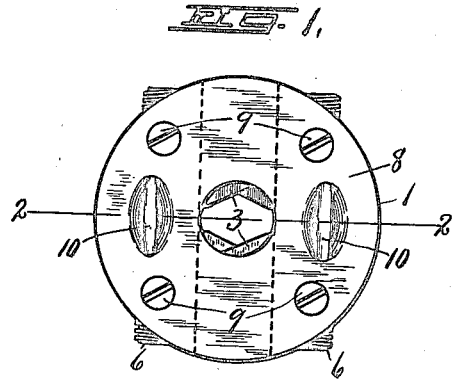
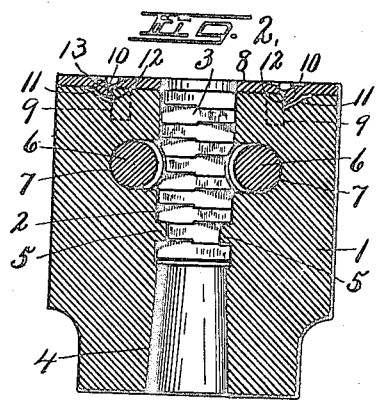
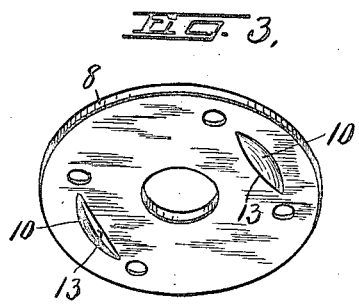
INVENTOR
H. Casler
BY Howard P. Denison
ATTORNEY.

Patented Oct. 17, 1922.

1,432,278

UNITED STATES PATENT OFFICE.

HERMAN CASLER, OF CANASTOTA, NEW YORK.

DRILL CHUCK.

Application filed March 29, 1919. Serial No. 285,964.

*To all whom it may concern:*

Be it known that I, HERMAN CASLER, a citizen of the United States of America, and resident of Canastota, in the county of Madison, in the State of New York, have invented new and useful Improvements in Drill Chucks, of which the following, taken in connection with the accompanying drawings, is a full, clear, and exact description.

This invention relates to certain improvements in drill chucks and analogous implements involving the use of a cylindrical head having a diametrical slot or guideway extending from side to side and through the outer end face thereof for receiving radially movable gripping jaws whereby the tool or work may be tightened and released upon and from the head.

In chucks of this character the jaws are preferably operated by one or more screws journaled in the side wall or walls of the slot and engaged with threads in the corresponding side or sides of the jaws thus causing a greater or less tendency to spring or spread the walls of the slot and particularly when tightening the jaws upon the tool or work.

The main object of my present invention is to provide a more efficient and economical means for firmly holding the opposite walls of the slot in fixed relation to each other against spreading or springing under all conditions than has heretofore been practiced.

One of the specific objects is to bridge the slot by means of a relatively thin circular metal plate secured flatwise to the end face of the head by screws or equivalent fastening means, and to provide said plate with opposed ribs or shoulders running lengthwise of the slot at opposite sides thereof for interlocking engagement with companion shoulders or abutments on the adjacent portion of the end face of the head so as to positively resist any tendency of the walls of the slot to spread or spring outwardly at points most remote from the base of the slot where the radial thrust is more appreciable.

A further object is to recess the outer end face of the head in such manner as to receive the ribs on the inner face of the plate and at the same time to assist in centering said plate upon the head when securing it in place.

Other objects and uses relating to specific parts of the head and plate will be brought out in the following description.

In the drawings:

Figure 1, is an end face view of a drill chuck embodying the various features of my invention.

Figure 2, is a longitudinal sectional view taken on line 2—2 Figure 1.

Figure 3, is a perspective view of the detached bridge plate viewed from its inner side.

As illustrated, this chuck comprises a cylindrical head —1— of suitable metal having a diametrical slot —2— extending axially the greater portion of the length of the head and also extending from side to side and through the outer end of said head to form a guideway for a pair of opposed radially movable jaws —3—, the inner end of the head being provided with a central lengthwise tapered opening —4— adapted to fit upon the usual tapered spindle (not shown) for holding the head in the machine in which it is adapted to be used.

The opposite walls of the slot are provided near the base thereof with lengthwise ribs —5— adapted to enter the usual grooves in the opposite faces of the jaws for holding the latter against axial displacement in the slot —2—.

The jaws —3— are adapted to be moved simultaneously in the slot —2— by one or more (in this instance two) screws —6— which are journaled in suitable bearings —7— in the head —1— at opposite sides of said slot, each screw being provided with right hand and left hand threads for engaging the adjacent side of their respective jaws for effecting the simultaneous movement of both jaws in opposite directions.

These screws are necessarily arranged in the opposite walls of the slot —2— between the inner and outer ends thereof and parallel therewith, and, therefore, tend to spring said walls apart, particularly when tightening the jaws upon the work, and in order to obviate this tendency and to firmly hold the outer ends of said walls in fixed relation under all conditions, I have provided a relatively thin circular bridge plate —8— of substantially the same diameter as the outer end of the head —1— to which it is adapted to be secured flatwise by means of screws —9— as shown in end face view in Figure 1, and by dotted lines in Figure 2.

In order to relieve the screws —9— from shearing strains and to more firmly hold the opposite walls of the slot in fixed relation, the plate —8— is provided with a pair of opposed lengthwise ribs —10— running parallel with and at opposite sides of the slot —2— and adapted to enter lengthwise grooves or channels —11— in the adjacent portions of the end faces of the head —1—.

The channels or recesses —11— and ribs —10— are located equal distances from the longitudinal center of the slot —2— and axis of the head —1— which permits the plate to be reversed side for side and applied to the end face of the head with equal facility in either position, it being understood that the screw holes in the plate and head are arranged to register with each other in both positions.

The channels or recesses —11— are preferably formed by a rotary cutter and are, therefore, curved about an axis at right angles to that of the head but parallel with each other, the inner walls of the channels being substantially parallel with the axis of the head to form abutting shoulders —12—, while the outer walls are preferably beveled or inclined outwardly and axially to facilitate the centering of the bridge plate when applied to the adjacent end of the head.

The ribs —10— are preferably formed by pressing or striking up portions of the bridge plate beyond the inner face thereof, and then milling the inner edges of the ribs in planes parallel with the longitudinal center of the slot to form abutting shoulders —13— the same distance apart as the shoulders —12— so that when the plate is applied to the end face of the head, its shoulders —13— will fit snugly against the companion shoulders —12— on said head, and thereby lock the walls of the slot against spreading irrespective of the screws —9—.

In other words, the ribs —13— coacting with the shoulders —12— constructed in the manner described, not only reduce to a minimum the shearing strains upon the screws, but also hold the opposite walls of the slot in fixed relation irrespective of said screws and enable the plate to be easily and quickly applied to the head or removed at will without in any way interfering with the free operation of the jaws and their operating means.

The term "chuck" in addition to its ordinary meaning is intended to cover the use of reamers and analogous tool holders which are weakened more or less by transverse slots.

What I claim is:

In a drill chuck, the combination of a head having a slot extending diametrically therethrough from side to side and through one end of the head, the open end face of the head being disposed at right angles to its axis and provided with channels at opposite sides of and parallel with said slot, the sides of the channels nearest the slot being straight and parallel, a circular plate applied to the open end face of the head and having portions thereof at opposite sides of its axis provided with ribs having their sides facing each other disposed in planes parallel with the slot in the head and engaged with the corresponding sides of the channels, the depth of said channels and ribs being gradually increased from their ends toward their centers to facilitate the centering of the plate on the head and screws engaging in apertures in the plate and head at opposite ends of the channels and ribs for securing the plate to the head.

In witness whereof I have hereunto set my hand this 25th day of March, 1919.

HERMAN CASLER.

Witnesses:
HENRY O. TRAVIS,
G. A. STROMBLAD.